Figure 1:
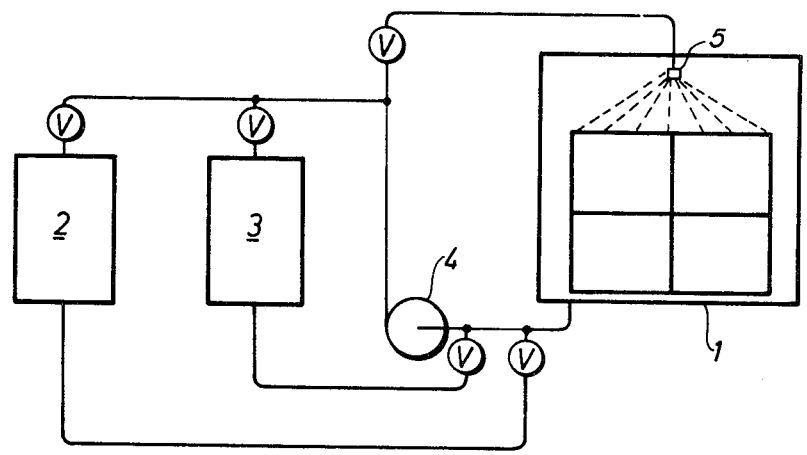

United States Patent [19]

Lagerström et al.

[11] 4,048,341
[45] Sept. 13, 1977

[54] PROCESS AND AN APPARATUS FOR INCREASING THE FEED VALUE OF LIGNOCELLULOSIC MATERIALS

[75] Inventors: Gösta Bertil Lagerström, Glumslov; Olof Arthur Mattsson, Viken, both of Sweden

[73] Assignee: Boliden AB, Stockholm, Sweden

[21] Appl. No.: 593,662

[22] Filed: July 7, 1975

[30] Foreign Application Priority Data

July 8, 1974 Sweden .................. 7408979

[51] Int. Cl.$^2$ .................. A23K 1/00; A23K 3/00
[52] U.S. Cl. .................. 426/69; 426/635; 426/636; 426/807
[58] Field of Search .................. 426/2, 69, 74, 623, 426/626, 635, 636; 162/78, 77; 127/37; 260/17.5, 21; 71/28

[56] References Cited

U.S. PATENT DOCUMENTS

| | | | |
|---|---|---|---|
| 2,394,989 | 2/1946 | Dreyfus et al. | 162/78 |
| 3,212,932 | 10/1965 | Hess et al. | 426/635 X |
| 3,878,304 | 4/1975 | Moore | 426/69 |

FOREIGN PATENT DOCUMENTS

| | | |
|---|---|---|
| 88,556 | 11/1956 | Norway |
| 46,598 | 7/1918 | Sweden |
| 127,787 | 11/1946 | Sweden |

*Primary Examiner*—Raymond N. Jones
*Assistant Examiner*—R. A. Yoncoskie
*Attorney, Agent, or Firm*—Gordon W. Hueschen

[57] ABSTRACT

The invention relates to a process for increasing the feed value of lignocellulosic materials by contacting the material with an alkaline liquid. The alkaline liquid supplied in excess is allowed to run off the material before any essential alkalization effect has been reached. After the liquid absorbed in the material has provided its effect an acid solution or nutritive solution is added to the material for neutralization of non-desired excess of alkali. Said solution is applied in such an amount as to at least correspond to the residual absorption capacity of the material resulting after the drainage due to the effect of alkaline liquid absorbed by the material. The invention also provides for an apparatus suitable for carrying out such process.

12 Claims, 2 Drawing Figures

PROCESS AND AN APPARATUS FOR INCREASING THE FEED VALUE OF LIGNOCELLULOSIC MATERIALS

The present invention relates to an apparatus and a process for increasing the feed value of lignocellulosic materials, for instance cereal straws, while avoiding formation of waste deleterious to the environment. The invention is particularly directed to the treatment of straw, but it should be observed that even if in this disclosure the invention is mainly illustrated while referring to treatment of straw the invention covers the treatment of all kinds of lignocellulosic materials.

By straw one usually refers to the stalks remaining from mature threshed crop. The straw can be used as a fodder for ruminants, but the feed value is low in view of a rather pronounced lignification, i.e. the cellulose thereof is enclosed in lignine. The lignine is enclosing the cellulose and prevents the cellulose-degrading enzymes from the microorganisms in rumen from exerting their activity. In this form the essential value of the straw lies in the fact that it imparts to the fodder mass a structure suitable for the ruminants, thereby promoting normal rumen activity, which in turn effects the fodder conversion capacity and thereby also the economy of production.

In the table below there are given analyses for some different types of straw.

| Type of plant | Ash content % | Lignine % | Cellulose % | Pentosanes % |
|---|---|---|---|---|
| Straw of barley | 4 | 14 | 35 | 28 |
| Straw of oats | 5 | 15 | 37 | 29 |
| Straw of wheat | 3 | 17 | 39 | 29 |
| Straw of rye | 4 | 18 | 40 | 27 |

Only a small fraction of the above-indicated values can be utilized by the animals. This means that the straw will have limited possibilities of use. That is to say, untreated straws having these substantial proportions of valuable nutrients are nevertheless only suitable for maintenance rations for, e.g., growing ruminants and non-lactating cows. These valuable nutrients of untreated straws are not usually in available forms or adequate for the nutritional requirements of lactating ruminant females or for rapid weight gains in growing ruminants. Therefore, straw is to-day mostly considered as waste and it is frequently burnt in the field or ploughed into the soil. The burning is regrettable not only from the point of view that enormous feed values are wasted thereby but also from the point of view that the heavy generation of smoke is inconvenient from an environmental point of view and also results in a considerable fire hazard for the environment. Thus, it is highly desirable to take care of this feed reserve available in enormous amounts in the whole world.

In order to expose the cellulose it is necessary to break down or at least create openings in the lignine, so that the cellulose-degrading enzymes from the microorganisms of rumen are enabled to attack the cellulose. It is known that a loosening can be obtained by treatment with different chemicals, such as sodium hydroxide, ammonia, sodium sulphide etc. Most frequent is use of sodium hydroxide, since this chemical is relatively cheap. The high-value fodder cellulose can be loosened hereby, which means that the alkalized straw will be well suited for constituting a certain part of the fodder for high-production ruminants, i.e. animals subject to high production requirements. Factors of importance for the result of an alkalization of straw are primarily alkali concentration, pressure, temperature and reaction time.

Methods of treating straw with alkali were known already at the beginning of the 20th century and a certain production of fodder cellulose from straw took place during the war 1914–18, particularly in Germany.

In these methods the straw was boiled in a solution of sodium hydroxide, sometimes under increased pressure. The method did not enjoy any wide-spread use since it required expensive plants. During the years 1917–1919 the so-called Beckmann-method (after Ernst Beckmann), was however, developed, whereby a good result of alkali treatment of straw could be obtained in a simple and non-expensive way. According to this method the straw is kept in a cold, 1–2% NaOH-solution for 18–24 hours, whereafter the excess of alkali is washed away with water. Straw treated in this way is usually called "alkalized straw." After 1940 the method has obtained wide-spread use in Norway, where also a number of investigations of the feed value of the alkalized straw has been made. It has been established, that it is possible by the alkalization to recover up to 50 fe (feed units*) per 100 kgs of straw. As compared with untreated straw this amounts to an increase by 30 fe. When alkalizing according to the Beckmann-method the ability of the straw to promote a high rumen activity is maintained in that the fodder mass retains a suitable structure.

*One feed unit equals the fodder value of 1 kg of barley grain.

In order to alkalize 100 kgs of straw a container space of about 2.2 m$^3$ is required. The volume of the alkali solution is about 1000–1400 l and the content of NaOH is about 1.4 kg/100 l of water. The alkali treatment is carried out at environmental temperature and dependent thereon and also on the alkali concentration the period of treatment varies but is, however, normally 18–24 hours. After completed treatment the used alkali, the so-called black liquor, may be used again after dilution with wash water and replacement of consumed NaOH by about 8 kgs per 100 kgs straw. The straw loses about 20% of its solids content in the alkali treatment. A major part of the losses are present in the black liquor, which therefore usually has to be thrown away after a few uses if the result of the alkali treatment shall not be impaired.

After completed alkali treatment the straw shows a strong alkaline reaction. In order to be useful as a fodder the excess of alkali must be eliminated, which is done by washing. For this purpose 3–4.5 m$^3$ of water per 100 kgs straw are required. A minor part of the washings is used for diluting the black liquor. However, the main part thereof will have to be discarded. It has also been suggested to neutralize the excess of alkali by using acid. However, no practical and economical process for doing this on the farm has not been developed.

Alkalization according to the Beckmann-method thus requires large amounts of water, which highly delimits the applicability of the method. Even where the water supplies are good it has been necessary during the last years to set up delimitations on or prohibit this kind of straw alkalization, since generally it is not permitted to discharge black liquor or washings which, in addition to alkali, contain organic substances corresponding to about 20% of the dry weight of the untreated straw. Among the substances of the straw which are lost, several have a high feed value, inter alia, the high fraction of the contents of pentosanes will be lost.

The Beckmann-method results in a product of minor stability, which means that the production must take place in limited quantities at each occasion. Usually, no greater quantities are prepared than can be consumed in a few days. Moreover, the treated straw has a high water content which makes long transportations impossible. Therefore, the plant will be very small and can cover the demand only within a very delimited area.

By using a Danish method, the so-called FHI-method (Forskningsinstitutet for Handels og Industriplanter), part of the drawbacks of the Beckmann-method are eliminated.

In this method, called "the dry alkalization method," the straw is initially chopped, whereafter 4.5–5% NaOH in the form of a solution and based on the amount of straw is added to the straw. The treated chopped straw is transferred to a box press, whereby the right design of the lower die the straw is subjected to high pressure and a temperature of about 100° C. The final product is obtained as "cobs" having a feed value of about 60 fe/100 kgs dry solids. The product is storage-stable and its manufacture takes place without environmental inconveniences. One disadvantage is, however, that the treatment, contrary to the Beckmann-method, results in a far-going mechanical disintegration of the straw, which makes the final product less suited as a structure fodder. In this way the straw has lost its natural possibilities of positively effecting the fodder digestion ability of the ruminants.

The Danish method is to be considered as an industrial refinement process for straw in that it requires investments in apparatus, such as drying and pressing plants. However, the process is planned to take place in green fodder dryers having spare capacity during the winter half year, whereby the investments can generally be delimited to apparatus for alkali-treatment and pressing. As compared to the Beckmann-method high costs for transportation and drying energy are added. Also in a compressed state straw has a low volume weight, about 100–150 kgs/m³, in view of which the economy does not allow long transport distances. For farms lying far away from the plant the method is therefore less attractive.

To summarize with regard to the prior art the following drawbacks are noted:

The Beckmann-method

1. High water consumption.
2. Losses of feed values with black liquor and washings.
3. High consumption of chemicals by losses in black liquor and washings.
4. Residual solutions must be discarded, which is unacceptable from an environmental point of view.

The FHI-method

1. High energy costs for pressing and drying.
2. High transportation costs.
3. Unsuited for small production volumes (farm plants) in view of the high investment cost.
4. Degradation of the fodder structure.

It has now surprisingly shown that alkalization of lignified grass can be carried out in a simple and non-expensive manner without accompanying disadvantages of the prior art. The method according to the present invention does not result in waste solutions, whereby the consumption of chemicals is reduced and no environmental problems are caused. The whole amount of dry solids of the grass remains in the final product together with the whole amount of added water. As compared to the Beckmann-method about 25% higher yield of dry solids is obtained and the water consumption is reduced to about 10%. The process is suited for the farm and can easily be adapted to different performances and capacities and has only a very low energy and transportation requirement. Moreover, the method results in a fodder where the original structure of the grass is maintained.

The process of this invention is based on the fact that lignocellulose materials, when quenched or sprayed with alkali solution of a suitable concentration, absorb such an amount of solution as is required to obtain a good alkalization effect. The excess of alkali is then allowed to run off and is used for the treatment of a new quantity of material after replacement of absorbed alkali solution.

The period of time of contact between the material to be treated and the whole amount of alkali solution can be kept so short that only a minor amount of organic material will be extracted. This fact together with the fact that absorbed solution is replaced with fresh solution means that the alkali solution also after a great number of uses obtains a very low content of organic substance. Accordingly, in this process no black liquor which has to be discarded will result.

After the alkali treatment the material is stable and can be stored for instance in a silo or loosely deposited on a floor. During this storage time which can last from a couple of hours up to several months, the alkalization reaction takes place. Depending on the storage time preferred for technical reasons the alkali concentration and in certain cases also the temperature of alkalization is adjusted to result in the desired alkalization effect.

The material treated in this way with alkali is not usually used directly as a fodder. Usually, the pH-value is too high in order that the palatableness shall be sufficient and in view of which a certain part of the alkali excess must be neutralized. The method of this invention, in addition to the quenching or spraying procedure described above, is based on the surprising discovery that the material after alkalization has a considerable capacity of again absorbing liquids. This ability is utilized to supply a neutralizing solution, which thus can be done without resulting in any residual solution. However, in practice a somewhat greater amount of solution must be added than that absorbed. Otherwise an even pH-distribution cannot be obtained in the mass. In the method of this invention the neutralization takes place in view of the fact that the acid solution is circulated through the material in such a manner as to be distributed over the mass by a distributing device and is allowed to flow through the material, the drained amount being then returned to the distributing device. In this manner only a minimum amount of solution has to be used. The circulation takes place for such a long period of time that largely the same pH is obtained in the mass as a whole. Excess of solution is permitted to run off and absorbed solution is replaced with water and acid.

Alkali treatment as well as neutralization may be carried out in the same manner, i.e. by spraying and circulation. In this embodiment the method requires only very simple equipment consisting of a device for spraying and circulation, protection, such as a shield around the material to be treated and storage vessels for the solutions. In view of the fact that also the alkali amount of this embodiment is minimized hot alkali can be used without great expense. Hereby the capacity of the plant may be significantly increased in view of the rapid effect of the alkali.

If quenching in alkali is selected instead of spraying a bigger storage vessel for alkali is required and also a container for the quenching operation. Moreover, a lifting device is required to lower the material into and lift it up from the quenching container. However, quenching is generally quicker than spraying and may in view of this impart larger capacity to the plant. When treating very great amounts of material during a short interval of time a continuous quenching or spraying device may be of advantage.

Treatment of great amounts of straw after harvest may in certain cases offer great advantages. Under inferior harvesting conditions the moisture content of the straw may be so high as to prevent storage in the state as harvested without being attacked by mould. In view of the alkali treatment a product capable of storage may be obtained which as required may be neutralized and used as a high quality fodder. Usually the acid requirement for neutralization will decrease with increased storage time.

The neutralization should not be performed earlier than 3-5 days before use, since after the neutralization the product is capable of storage only to a limited extent. At temperatures below 5°-10° C the product may, however, be stored for several weeks without deterioration of smell and taste.

The neutralizaton may in principle be made with any acid. However, from economical reasons an acid should be selected which at the same time enriches the fodder. Such acids are for instance acetic acid, phosphoric acid and sulphuric acid. The amount of acid is determined by the desired pH of the final product and by the excess of alkali. Adjustment of the amount of alkali and other conditions can easily be made, so that both the desired alkalizing effect is provided and the added amount of acid results in the desirable addition of for instance phosphorus and sulphur to the fodder.

The ability of the alkali-treated material after the alkali has provided its effect to further absorb a certain amount of solution is essentially due to the loosening of the structure and the swelling provided by the alkali. Partly the absorbing capacity is also the function of pH. In addition to utilizing this absorption to provide a closed system for the neutralizaton, which according to the circulation process described above results in an even pH-distribution in the product, the absorption in the method of this invention may in the same way be utilized for supply of inter alia urea, molasses and different salts, for instance salts containing $NH_4$, Ca, Mg, P, K, N, Cu, Co, Zn, Mn, I, Se, S and I. The ability of the animals utilizing urea or other simple nitrogen compounds is to a great extent favoured if these substances are evenly distributed in a great amount of fodder having a suitable energy content. By the method of this invention there is thus provided, in addition to alkalization of the lignocellulosic material and thereby resulting increase of the available energy content, also an even distribution of the simple nitrogen compounds with no extra working operation.

It is contemplated that juices resulting from green fodder ensilation can be recovered and added after or along with the required amount of acid and/or other feed supplements to the alkalized material for desired enrichment.

The treatment may, of course, also be applied to non-thrashed crop. In view of the fact that the grains will then be included in the final product there is obtained a significant increase of the feed value and the energy content, which enables simultaneous supply of increased amounts of simple nitrogen compounds.

In case it is desirable to obtain a treated fodder having a low alkali content it is particularly advantageous to carry out the alkali treatment at an increased temperature, whereby the alkali content may be kept at a considerably lower level. The treatment at an increased temperature may be carried out in such a manner that the material is treated with an alkaline liquid which is preheated, the initial temperature of the liquid preferably being at least about 35° C. An upper limit is, of course, the boiling point of the liquid. The advantages gained by carrying out the alkali treatment at an increased temperature are, inter alia, the following:

A. Treatment at increased temperature results in reduced consumption of chemicals, which is an economical advantage.
B. The treated material obtains a lower alkali content.
C. The period of treatment is shortened as compared to treatment at environmental temperature.

The present invention also relates to an apparatus for carrying out the method. This apparatus contains in principle a first container for the material to be treated, a second container for alkaline liquid and a third container for acid solution. The apparatus further includes conduit means, through which the first container alternatingly can be connected with the second container and the third container. These conduit means contain valves so that a first circuit for alkaline liquid and a second circuit for acid solution, respectively, can be established, the apparatus moreover containing means for circulating the liquid and the acid solution, respectively, in said circuits. This circulating means suitably consists of a pump.

The embodiments described are to be considered as examples only and they show how the method according to the invention can be adapted to different ways of operation and product requirements. The method is useful for lignocellulosic materials in general and is not delimited to straw.

The invention will now be further described by non-limiting examples referring to treatment of straw including alkalization and neutralization and/or supply of nutritive solution. In the appended drawing FIGS. 1 and 2 show apparatus suitable for the purpose in question.

Figure 2:
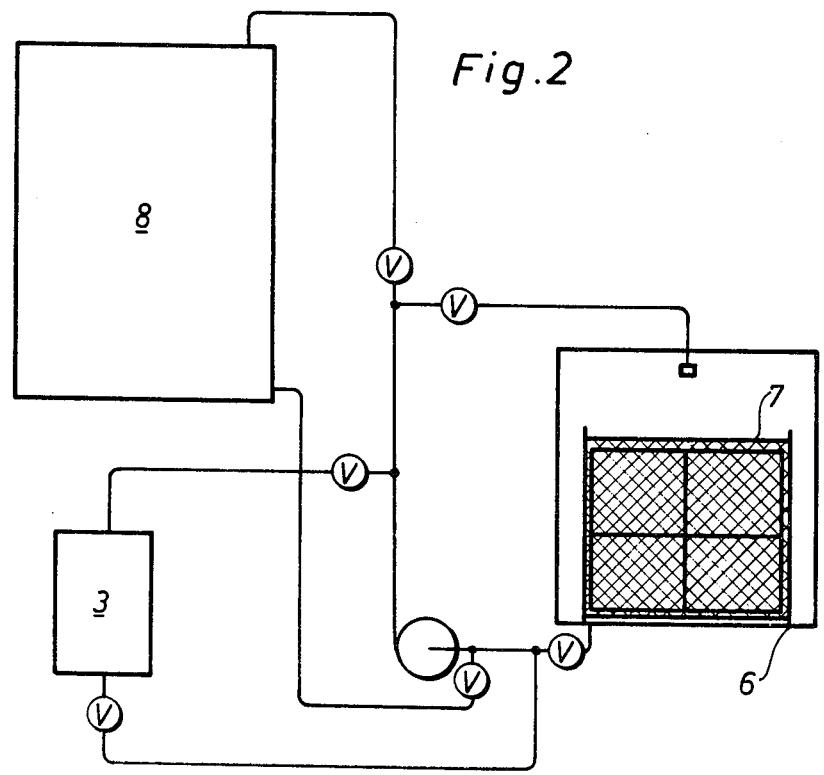

The apparatus according to FIG. 1 consists of a container 1 (which may be open) for straw, a container 2 for alkali solution and a container 3 for neutralization agent and/or nutrient solution, a pump 4 and a distributing device 5. Containers 1, 2 and 3 are provided with bottom outlets which all through valves alternatingly can be connected with the suction side of the pump. By means of the pump 4 solution from container 2 and container 3 can be transferred to container 1 through distributing device 5.

For the straw treatment the straw is transferred into container 1 in loose form or in the form of bales. By means of pump 4 alkali solution from container 2 is brought to circulate through container 1 via the distributing device. The circulation is maintained for such a period of time that the straw will be soaked in alkali solution. Excess of solution is drained and then returned to container 2. The straw is then allowed to react with absorbed alkali solution under such a long period of time as is required for obtaining the desired alkalization result. This can take place either in the container 1 or at another storage site.

The straw treated in this manner and placed in container 1 is then supplied with solution from container 3 for neutralization of the excess of alkali and/or supplying thereto different nutritive substances in a dissolved state. The solution is allowed to circulate through the straw for such a period of time that an even distribution of nutritive substances is obtained and/or largely the same pH is obtained in the whole mass of straw. Excess of solution is drained and then returned to container 3. Spent chemicals and liquid in the containers 2 and 3 are replaced and mixed with the respective residual solutions by circulative pumping.

The apparatus according to FIG. 2 is used when it is desired completely to quench the straw in alkali solution.

The apparatus according to FIG. 2 differs from that of FIG. 1 only in that container 1 is replaced with a closed container 6. The container 8 for alkali solution is preferably positioned in such a manner that the whole contents thereof may be transferred to container 6 by self-drainage through the bottom outlet. Alternatively, the solution may be transferred to container 6 from above by means of the pump.

In the alkali treatment the straw is placed in container 6, preferably in a net basket with a lid which is locked. Then alkali solution is supplied from container 8 in such an amount that the straw is completely soaked by solution. The straw is then permitted to absorb solution for the sufficient period of time. Excess of alkali solution is pumped back to container 8. The continued treatment, alkalization, neutralization of excess of alkali and/or supply of nutritive solution and the preparation of new solutions, is analogous to the process as shown in connection to FIG. 1.

EXAMPLE 1

In container 1 (see FIG. 1) provided with a bottom outlet, four bales of straw, each measuring about 35 × 45 × 90 cm, the total weight thereof being 39.7 kgs, were inserted. Container 2 was charged with 157 l hot water and 5.1 kgs of 47% NaOH-solution, resulting in a solution containing 15 g of NaOH/l and having a temperature of 68° C. By means of pump 4 the alkali solution was supplied to the full cone nozzle 5 and distributed over the straw. The working pressure was 1.7 kgs/cm² and the flow through the nozzle 18 l/min. After emptying of the container 2 the alkali solution was circulated for 2 hours. The temperature in the interior of the bales of straw was then 41° C. Excess of alkali solution was drained for 14 hours and then pumped back to container 2. The volume was 71 l. Analysis of a sample gave a dry solids content of 48.6 g/l and a NaOH-content of 8.6 g/l. The temperature of the straw was 31° C.

Then an acid solution was pumped from container 3 and circulated in the same way as the alkali solution for 2 hours. The solution then had the following composition:

79 kgs water
880 g H₃PO₄
245 g NaOH
200 g H₂SO₄
2600 g urea
1600 g CaCl₂.2H₂O
52 g trace element mixture consisting of 16.4% CuSO₄.5H₂O, 0.8% CoSO₄.7H₂O, 45.4% ZnSO₄.H₂O, 16.4% MnSO₄.H₂O, 0.4% Ca(IO₃)₂.H₂O and 20.6% MgO.

After completed circulation the excess was drained for 2 hours and then pumped back to container 3. The measured volume was 43 l. After addition of 440 g H₃PO₄, 100 g H₂SO₄, 1300 g urea, 800 g Cacl₂.H₂O and 26 g trace element mixture the solution was diluted to 80 l with water.

The straw was well alkalized, i.e. the nodes were very soft and easily crushed. Samples taken at different places showed pH-variations between 7.5 and 8.9. The finally treated straw weighed 167 kgs.

47% NaOH-solution and water were added to the residual solution in container 2 in order to give 160 l of solution with 15 g NaOH/l.

The procedure was repeated four times, the residual solutions from the preceding treatment being used after dilution and addition of spent substances. The dry solids content of drained alkali solution in the five treatments was:

| | |
|---|---|
| Treatment 1 | 48.6 g/l |
| Treatment 2 | 50.6 " |
| Treatment 3 | 55.2 " |
| Treatment 4 | 58.0 " |
| Treatment 5 | 60.2 " |

Samples were taken in the upper, intermediate and bottom layers of completed straw from the fifth treatment. Analysis gave the following results:

| | Top layer | | Intermediate layer | | Bottom layer | |
|---|---|---|---|---|---|---|
| | Sample 1 | Sample 2 | Sample 1 | sample 2 | Sample 1 | sample 2 |
| P₂O₅ % | 1.2 | 1.4 | 1.2 | 1.1 | 1.1 | 1.3 |
| Ca % | 0.70 | 0.73 | 0.65 | 0.71 | 0.67 | 0.65 |
| Cu μg/g | 44 | 46 | 51 | 44 | 38 | 42 |
| Zn μg/g | 110 | 96 | 120 | 193 | 100 | 96 |
| N % | 2.1 | 2.0 | 2.2 | 1.9 | 2.1 | 1.9 |

Samples of the neutralization solution were stored at room temperature under exposure to air for 3 weeks. No change in smell could be observed.

EXAMPLE 2

A basket 7 having bottom, walls and lid of steel wire net was lowered into container 6 (see FIG. 2). The basket contained four bales of straw having a total weight of 40.7. The basket was anchored in the container, whereafter 900 l NaOH-solution containing 15 g NaOH/l from the container 8 positioned at a higher level were permitted to flow into said container from below. The temperature of the solution was 15° C. 30 minutes after complete coverage of the whole straw mass with solution the excess was pumped back to container 8. After 15 minutes the basket was lifted, positioned on the floor and covered with a tarpaulin. In container 6 another 15 l of solution had collected, which were pumped up into container 8. The solution in container 8 was only slightly discoloured of dissolved organic substance. After 24 hours at 18° C the straw was well alkalized and was lowered into container 6.

80 l solution containing 690 g $H_3PO_4$ was prepared in container 9. The solution was circulated as in Example 1 for 2 hours and the straw was allowed to drain for 1 hour. The residual solution had a volume of 50 l and pH = 9.1. After the addition of 690 g $H_3PO_4$ the solution was diluted to 80 l.

The finalized straw weighed 171 kgs. pH in different parts of the straw mass varied between 9.3 and 9.9.

Spent alkali solution was replaced and the procedure was repeated. After a total of 5 runs the content of organic substance in the alkali solution was 1.8 g/l.

EXAMPLE 3

Straw was treated with a solution containing 15 g NaOH/l for 15 minutes in the same manner as in Example 2. Immediately after the treatment the straw was moved outdoors and protected by a tarpaulin. The outdoor temperature varied between −5° and +7° C during the test period which lasted for 125 days. After 7 days the straw was considered to be well alkalized. Samples were taken at different times for pH-determination.

| Days after alkali treatment | pH |
| --- | --- |
| 22 | 11.3 |
| 52 | 11.2 |
| 81 | 11.0 |
| 125 | 10.8 |

A neutralization test was carried out after 125 days. 380 g of straw were treated with 300 ml of a solution containing 1.12 g $H_3PO_4$ by repeated washings on a Büchner funnel. Drained volume of solution was constant = 140 ml after the third washing. 1.12 g $H_3PO_4$ were added to the residual solution and the solution was diluted to 300 ml. A new quantity of straw was washed with this solution. The volume of the residual solution was 145 ml. The experiment was repeated three more times. The dry solids content of the residual solutions and pH of the washed straw were measured:

| Wash test No. | Volume ml | Residual solution % ds | pH in straw after washing |
| --- | --- | --- | --- |
| 1. | 140 | 2.0 | 9.5 |
| 2 | 145 | 3.1 | 9.7 |
| 3 | 150 | 3.3 | 9.6 |
| 4 | 145 | 3.6 | 9.7 |
| 5 | 145 | 3.6 | 9.8 |

EXAMPLE 4

3 straw samples of 500 g each were treated in the following manner:

A. Quenching in 1.5% aqueous solution of NaOH of room temperature for 18 hours followed by drainage and washing with water in such amounts that a sample of the treated straw had a pH <11, drainage and drying in a ventilated hood at 65° C for 24 hours (the Beckmann-method).

B. Quenching in 1% aqueous solution of NaOH of room temperature for 30 minutes, drainage and storage in a plastic bag for 4 days at room temperature to avoid evaporation. The the sample was divided into two equal parts. One part was rinsed with water and dried as under A above. The other sample was transferred into a beaker and neutralized to be pH = 8.5 by supplying $CO_2$-gas, the sample being then dried as under A above.

C. Quenching in 1% aqueous solution of NaOH at 40° C, drainage and storage in a plastic bag for 24 hours at 40° C to avoid evaporization. The sample was divided into two equal parts which were treaed as under B above.

Moreover, treatment on a large scale was performed in the following manner:

About 60 kgs straw from the same stock as used in experiments A, B and C above were treated according to Example 2 but with 1300 l NaOH-solution containing 10 g NaOH/l and having a temperature of 55° C. Neutralization was carried out with 110 l of a solution containing 900 g $P_2O_5$ as $H_3PO_4$. The procedure was repeated eight times. After each procedure spent amounts of sodium hydroxide and water were replaced in the alkali solution. 900 g $P_2O_5$ as $H_3PO_4$ were added to the acid solution and spent amount of water was replaced after each procedure. The solutions were then used in the next procedure. From the eighth experiment a representative sample of alkali-treated and neutralized straw was taken and dried at 65° C in a ventilated hood.

In the four samples thus obtained and in a representative sample of untreated straw digestible organic substance was determined in vitro according to VOS method (den Braver, E. J. and Eriksson, S. 1967. "Determination of energy in grass hay by in vitro methods" Lantbr.hogsk. Annlr 33, 751–765). The results of these determinations and calculated yields, calculated as kgs of dried product per 100 kgs input of dried straw, and calculated as kg RDOM/100 kgs input of dried straw, is given in the following table:

| Way of treatment | in dried sample | | | Yield based on 100 kgs. untr. straw | |
| --- | --- | --- | --- | --- | --- |
| | org. subst. % | ashe % | RDOM[x] % | kg. dry product | kg. RDOM |
| Untreated straw | 96.7 | 3.3 | 42 | 100 | 41 |
| According to A (the Beckmann-method) | 94.9 | 5.1 | 68 | 80 | 52 |
| According to B, water rinsed | 95.3 | 4.7 | 69 | 83 | 55 |
| According to C, water rinsed | 94.2 | 5.8 | 70 | 88 | 58 |
| According to B, $CO_2$-neutralized | 90.1 | 9.9 | 79 | 102 | 73 |
| According to C, $CO_2$-neutralized | 89.8 | 10.2 | 76 | 107 | 73 |

-continued

| Way of treatment | in dried sample | | | Yield based on 100 kgs. untr. straw | |
|---|---|---|---|---|---|
| | org. subst. % | ashe % | RDOM[x] % | kg. dry product | kg. RDOM |
| Large scale, H₃PO₄-neutralization | 89.8 | 10.2 | 78 | 104 | 73 | x = rumen digestible organic matter.

From the table it is clear that the method of this invention results in an improvement of the yield with regard to RDOM of about 40% as compared to the Beckmann-method.

It is to be understood that the invention is applicable to all kinds of straw from lignified stalks of cereal types of grass, for instance rye, barley, wheat, oats etc. These stalks are generally obtained as straw upon threshing or grinding for separating the grains. It should be understood that all such materials are included in the expression "straw" as used in this disclosure.

What is claimed is:

1. Process for increasing the feed value of lignocellulosic materials which comprises contacting lignocellulosic material with an alkaline liquid, wherein the alkaline liquid is supplied in excess and the excess is allowed to run off the lignocellulosic material before any substantial alkalization effect has been reached and wherein the excess alkali that is allowed to run off may be used for the treatment of a new quantity of said material, and that, after the alkaline liquid absorbed in the lignocellulosic material has provided its alkalization effect for a time necessary to partially break down the lignin or create openings in the lignin and expose the cellulose for celluose-degrading enzymes in the rumen of a ruminant animal, an acid solution or nutritive solution is added to the treated material for neutralization, said solution being supplied in such an amount as to at least correspond to the residual absorption capacity of the lignocellulosic material resulting from the effect of the alkaline liquid absorbed by the material.

2. A process according to claim 1, wherein the lignocellulosic material is straw and the alkalization reaction is continued till the nodes of the straw have softened.

3. A process according to claim 1, wherein a nutritive solution is selected from the class consisting of urea; phosphoric acid, sulphuric acid, propionic acid, molasses, and metal salts.

4. A process according to claim 1 wherein the alkali treatment is carried out on unthreshed crop.

5. A process according to claim 1, wherein the alkaline liquid consists of a sodium hydroxide solution, the concentration of which is at least 4 g NaOH/l solution.

6. A process according to claim 1, wherein the alkali treatment is carried out at a temperature between about 35° C and the boiling temperature of the alkaline liquid.

7. A process according to claim 1, wherein the acid or nutritive solution is distributed over said treated material and allowed to flow therethrough, drained amounts of said solution being recirculated and again distributed over the said treated material, and that the circulation of the acid or nutritive solution provided in this manner is maintained for such a period of time that an essentially even distribution of said solution is obtained throughout the said treated material.

8. A process for increasing the ruminant feed value of a lignocellulosic material which comprises soaking said material with an alkaline liquid, removing any excess alkaline liquid and subsequently neutralizing excess alkali absorbed in or on the thus alkaline treated material with an acid or nutritive solution after the absorbed alkaline liquid has provided its alkalization effect on the treated lignocellulosic material, to wit, partially breaking down or creating openings in the lignin so as to expose the cellulose for cellulose-degrading enzymes in the rumen of a ruminant animal, thus obtaining a fodder product which is palatable to ruminant animals, has substantially the original structure of said treated material and substantially all the original dry solids, and which promotes normal rumen activity.

9. The process of claim 8, wherein the alkaline liquid is aqueous sodium hydroxide having a concentration of at least 4g NaOH/l solution.

10. The process of claim 9, wherein the aqueous sodium hydroxide is about 4g to about 15g/l.

11. A palatable fodder product obtained by the process of claim 8.

12. A palatable fodder product obtained by the process of claim 8, wherein alkalization is effected with aqueous sodium hydroxide and neutralization is effected with carbonic acid.

* * * * *